(12) United States Patent
Gong

(10) Patent No.: US 10,884,221 B2
(45) Date of Patent: Jan. 5, 2021

(54) ULTRA-SMALL-SIZED 4K-RESOLUTION ULTRA-SHORT-FOCUS PROJECTION OPTICAL SYSTEM

(71) Applicant: UNION OPTECH CO., LTD., Guangdong (CN)

(72) Inventor: Junqiang Gong, Guangdong (CN)

(73) Assignee: UNION OPTECH CO., LTD., Zhongshan (CN)

( * ) Notice: Subject to any disclaimer, the term of this patent is extended or adjusted under 35 U.S.C. 154(b) by 332 days.

(21) Appl. No.: 16/134,946

(22) Filed: Sep. 18, 2018

(65) Prior Publication Data

US 2019/0121093 A1   Apr. 25, 2019

(30) Foreign Application Priority Data

Oct. 23, 2017   (CN) .......................... 2017 1 0990235

(51) Int. Cl.
| G02B 13/00 | (2006.01) |
| G03B 21/14 | (2006.01) |
| G03B 21/00 | (2006.01) |
| G03B 21/28 | (2006.01) |

(52) U.S. Cl.
CPC ..... *G02B 13/0045* (2013.01); *G02B 13/0065* (2013.01); *G03B 21/008* (2013.01); *G03B 21/142* (2013.01); *G03B 21/147* (2013.01); *G03B 21/28* (2013.01)

(58) Field of Classification Search
CPC .. G02B 13/0065; G03B 21/28; G03B 21/008; G03B 21/142; G03B 21/147

USPC ........ 359/648–651, 689, 726–728, 737, 739, 359/740, 784, 809
See application file for complete search history.

(56) References Cited

U.S. PATENT DOCUMENTS

| 5,914,818 | A * | 6/1999 | Tejada ................... | G02B 13/02 |
| | | | | 359/663 |
| 7,911,704 | B2 * | 3/2011 | Takaura ................. | G03B 21/28 |
| | | | | 359/649 |
| 8,054,556 | B2 * | 11/2011 | Chen ...................... | G02B 17/08 |
| | | | | 359/649 |
| 8,089,706 | B2 * | 1/2012 | Kang ..................... | G02B 17/08 |
| | | | | 359/727 |
| 8,967,812 | B2 * | 3/2015 | Amano ................ | G03B 21/142 |
| | | | | 353/38 |
| 8,982,473 | B2 * | 3/2015 | Hsu ....................... | G02B 13/18 |
| | | | | 359/649 |
| 9,372,388 | B2 * | 6/2016 | Matsuo .................. | G02B 17/08 |
| 9,625,691 | B2 * | 4/2017 | Hsu ........................ | G02B 17/08 |
| 9,891,507 | B2 * | 2/2018 | Nishikawa ............ | G02B 15/14 |
| 10,063,819 | B2 * | 8/2018 | Matsuo ................. | G02B 13/16 |
| 10,228,547 | B2 * | 3/2019 | Kim ....................... | G02B 13/16 |
| 2009/0116124 | A1 * | 5/2009 | Minefuji ................ | G02B 17/08 |
| | | | | 359/727 |

(Continued)

*Primary Examiner* — Evelyn A Lester

(57) ABSTRACT

The present invention discloses an ultra-small-sized 4K-resolution ultra-short-focus projection optical system, which is characterized by including in sequence in a projection direction: a DMD chip, an equivalent prism, a 4K oscillating mirror, a refraction lens assembly and an aspherical reflector. Through reasonable distribution of focal power, the semi-aperture size of the reflector is reduced to be less than 50 mm, and the assembling sensitivity is substantially reduced, so that batch production can be realized.

10 Claims, 2 Drawing Sheets

(56) References Cited

U.S. PATENT DOCUMENTS

| | | | |
|---|---|---|---|
| 2010/0079733 A1* | 4/2010 | Lu | G02B 13/06 |
| | | | 353/69 |
| 2012/0327508 A1* | 12/2012 | Benoit | G03B 21/142 |
| | | | 359/364 |
| 2014/0049813 A1* | 2/2014 | Hsu | G02B 17/08 |
| | | | 359/364 |
| 2014/0118838 A1* | 5/2014 | Hsu | G02B 13/18 |
| | | | 359/649 |
| 2015/0185452 A1* | 7/2015 | Hsu | G02B 9/64 |
| | | | 359/728 |
| 2016/0216497 A1* | 7/2016 | Minefuji | G03B 21/006 |
| 2016/0238822 A1* | 8/2016 | Minefuji | G02B 13/0045 |
| 2016/0238825 A1* | 8/2016 | Minefuji | G02B 1/041 |
| 2016/0299415 A1* | 10/2016 | Minefuji | G03B 21/53 |
| 2016/0363746 A1* | 12/2016 | Minefuji | G03B 21/005 |
| 2018/0284403 A1* | 10/2018 | Gong | G02B 13/24 |

* cited by examiner

ULTRA-SMALL-SIZED 4K-RESOLUTION ULTRA-SHORT-FOCUS PROJECTION OPTICAL SYSTEM

CROSS REFERENCE TO RELATED APPLICATIONS

The present application claims the benefit of Chinese Patent Application No. 201710990235.3 filed on Oct. 23, 2017. All the above are hereby incorporated by reference.

TECHNICAL FIELD

The present invention relates to a projection optical system, and more particularly relates to an ultra-small-sized 4K-resolution ultra-short-focus projection optical system.

BACKGROUND ART

In recent years, with the development of projection technologies, projectors have been widely used in home, education, office and other fields, among which ultra-short-focus projection has been widely used in home, office and other fields due to its characteristic of projection of a large picture within a short distance.

At present, ultra-short-focus projection lenses, the sizes of which are limited by projection ratios, in the market are mainly designed as structures of refraction lens groups and reflection lens groups. Most of the ultra-short-focus projection lenses in the market have overall lengths more than 250 mm. Although the overall lengths of some ultra-short-focus projection lenses can be made below 250 mm, the projection ratios are sacrificed and a relatively small overall length and a relatively large projection ratio cannot be realized at the same time. A DMD chip in the market at present only supports the 1080P resolution. To support the 4K resolution, it needs to add an oscillating mirror between a lens and a lighting chip to convert 1 pixel into 4 pixels through a periodic vibration mode of the oscillating mirror to achieve the 4K resolution, so that a space for the oscillating mirror is required to be reserved in the back focal length of the lens, which would substantially increase the back focal length of the lens at this time, and the resolution and the projection ratio have to be sacrificed in order to realize a relatively short overall length. There is no ultra-short-focus lens capable of overcoming the above-mentioned disadvantages at the same time in the market at present.

The present invention is designed on the basis of such case.

SUMMARY OF THE INVENTION

The present invention aims to overcome the defects in the prior art and provide an ultra-small-sized 4K-resolution ultra-short-focus projection optical system having a projection ratio less than 0.21 and an overall optical length less than 202 mm.

Compared with the prior art, the present invention has the following advantages:

1. The ultra-small-sized 4K-resolution ultra-short-focus projection optical system is extremely high in resolution (supporting the 4K resolution), realizes the projection ratio less than 0.21, and does not cause a suppositional focus in a high-temperature state.

2. Through reasonable distribution of focal power in the ultra-small-sized 4K-resolution ultra-short-focus projection optical system, the semi-aperture size of a reflector is reduced to be less than 50 mm, and the assembling sensitivity is substantially reduced, so that batch production can be realized.

3. The ultra-small-sized 4K-resolution ultra-short-focus projection optical system can compensate conjugate distance variations under different projection distances and also correct field curvatures and distortions under different projection distances, so as to keep the resolutions under different projection distances unchanged.

Figure 1:
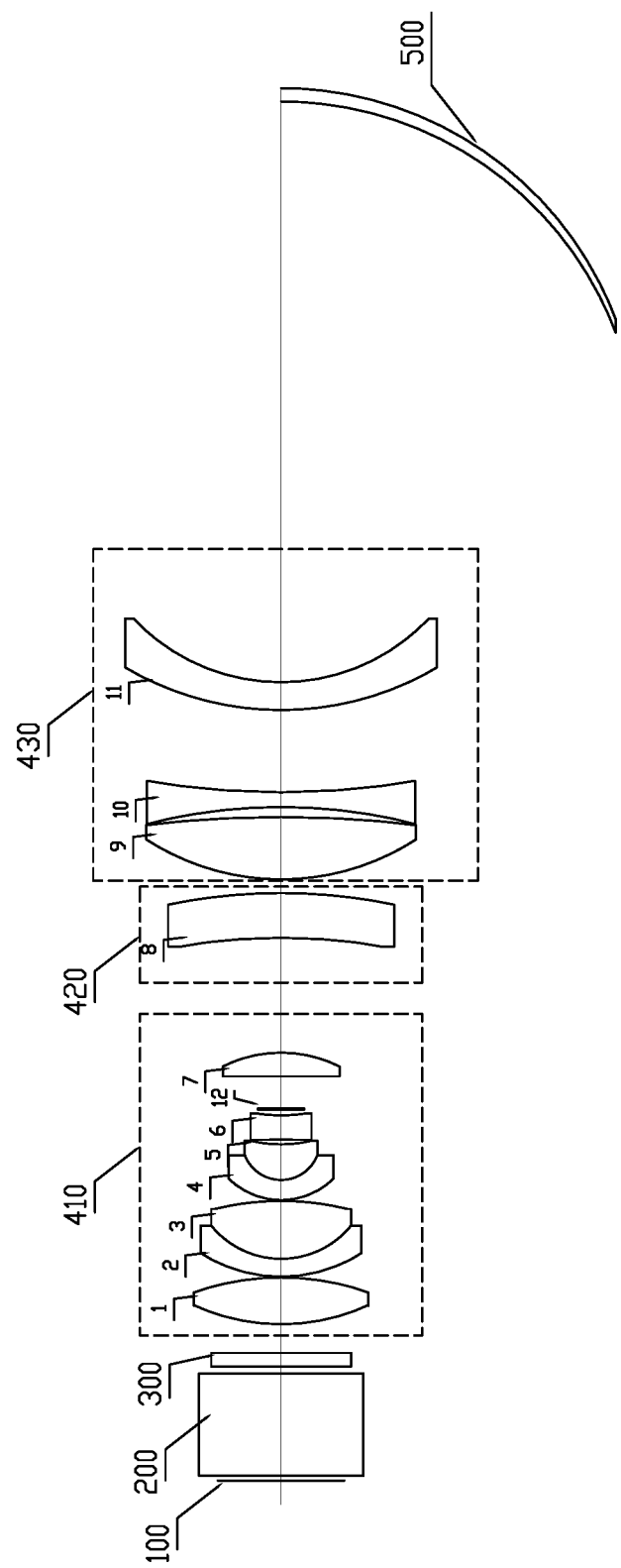
FIG. 1 is a schematic diagram of the present invention.

In the drawings: 100: DMD chip; 200: equivalent prism; 300: 4K oscillating mirror; 410: first lens group; 420: second lens group; 430: third lens group; 500: aspherical reflector; 1: first lens; 2: second lens; 3: third lens; 4: fourth lens; 5: fifth lens; 6: sixth lens; 7: seventh lens; 8: eighth lens; 9: ninth lens; 10: tenth lens; 11: eleventh lens; and 12: diaphragm.

DETAILED DESCRIPTION OF THE INVENTION

Technical features of the present invention are further described below in detail in combination with accompanying drawings to facilitate understandings of those skilled in the art.

Figure 2:
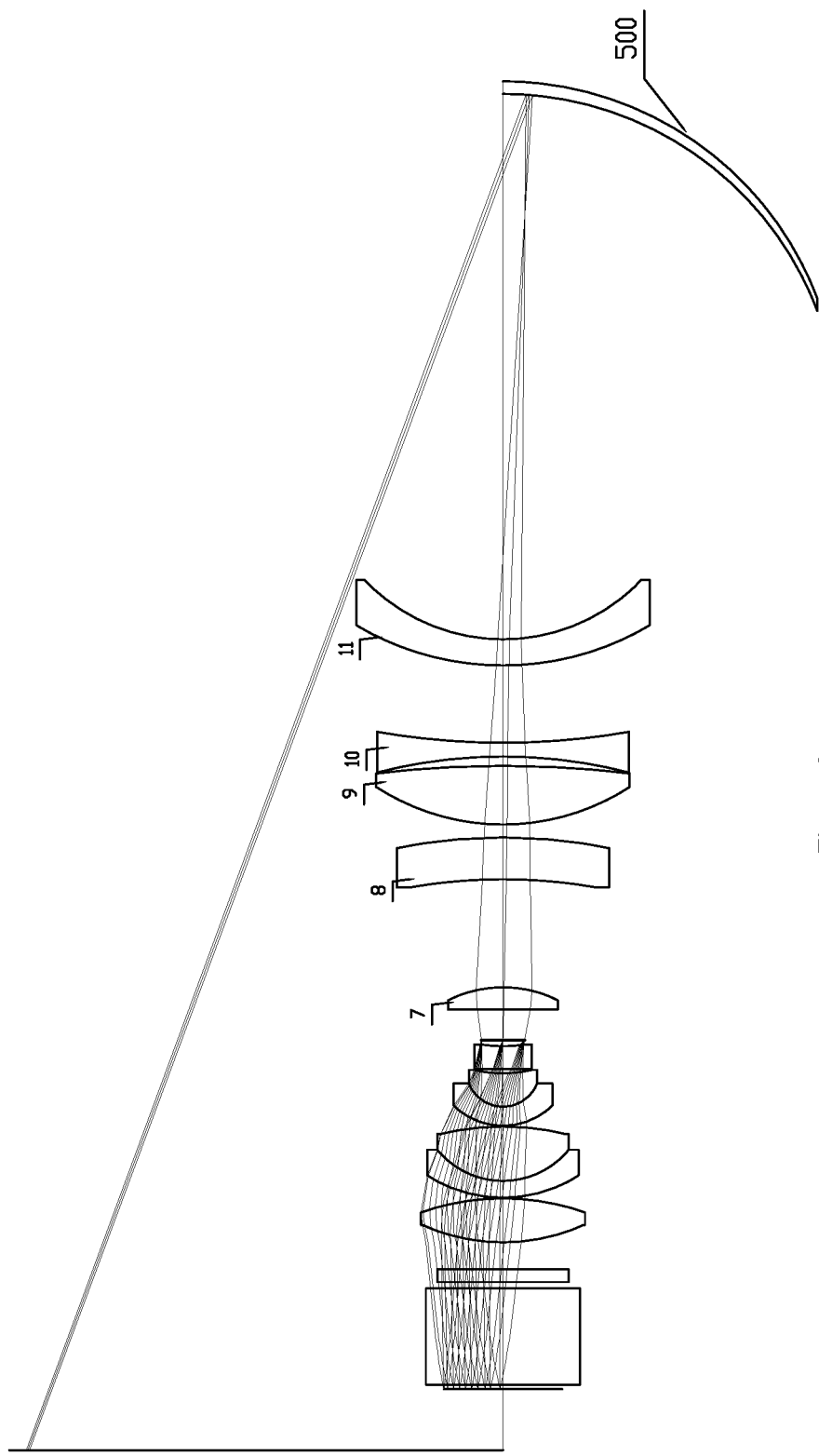
FIG. 2 is a schematic diagram of a light path of the present invention, in which a thin line is the light path.

Referring to FIGS. 1-2, an ultra-small-sized 4K-resolution ultra-short-focus projection optical system includes in sequence along a projection direction: a DMD chip 100, an equivalent prism 200, a 4K oscillating mirror 300, a refraction lens assembly and an aspherical reflector 500.

The refraction lens assembly includes in sequence along the projection direction:

a first lens group 410 capable of moving back and forth relative to the DMD chip 100, wherein the focal power of the first lens group 410 is positive and the first lens group is capable of moving back and forth relative to the DMD chip to compensate a variation of a back focal length during lens assembling;

a second lens group 420 which is capable of moving back and forth relative to the DMD chip 100, wherein the focal power of the second lens group 420 is positive; and a third lens group 430 which is static relative to the DMD chip 100, wherein the focal power of the third lens group 430 is negative.

According to the above ultra-small-sized 4K-resolution ultra-short-focus projection optical system, the first lens group 410 includes a first lens 1, a second lens 2, a third lens 3, a fourth lens 4, a fifth lens 5, a sixth lens 6, a diaphragm 12 and a seventh lens 7 in sequence along the projection direction. The second lens group 420 includes an eighth lens 8, both surfaces of which are bent towards the DMD chip 100. The third lens group 430 includes a ninth lens 9, a tenth lens 10 and an eleventh lens 11 in sequence along the projection direction.

Further, the first lens 1 has positive focal power. The second lens 2 has negative focal power. The third lens 3 has positive focal power. The fourth lens 4 has negative focal power. The fifth lens 5 has positive focal power. The sixth lens 6 has negative focal power. The seventh lens 7 has positive focal power. The eighth lens 8 has positive focal power. The ninth lens 9 has positive focal power. The tenth lens 10 has negative focal power. The eleventh lens 11 has negative focal power.

According to the above ultra-small-sized 4K-resolution ultra-short-focus projection optical system, the DMD chip 100 is deviated relative to the optical axis, so that the center of the DMD chip 100 has a deviation amount more than 125% relative to the optical axis to ensure that an emergent light ray of the refraction lens group does not interfere with the refraction lens group after passing through the aspherical reflector. The DMD chip has 0.48 inch, and has the resolution of 1920*1080 and supports a 0.5-inch ECD chip.

An image light beam is emitted from the DMD chip 100 and then passes through the equivalent prism 200 and the 4K oscillating mirror 300. When the 4K oscillating mirror 300 vibrates periodically, a signal sent by the DMD chip 100 may be extended by 4 times to output 4K resolution. When the 4K oscillating mirror does not vibrate, the output signal is 1 time at the resolution of 1080P. The refraction lens assembly receives the light ray outputted by the 4K oscillating mirror, and primary imaging is realized between the refraction lens assembly and the aspherical reflector 500. The aspherical reflector 500 reflects a primary image to a projection screen to form a high-resolution image.

According to the above ultra-small-sized 4K-resolution ultra-short-focus projection optical system, the focal power of the first lens group 410 satisfies $0.04 \leq |\varphi_{410}| \leq 0.05$. The focal power of the second lens group 420 satisfies $0.0002 \leq |\varphi_{420}| \leq 0.0003$. The focal power of the third lens group 430 satisfies $0.009 \leq |\varphi_{430}| \leq 0.0092$. The focal power of the aspherical reflector 500 satisfies $0.05 \leq |\varphi_{500}| \leq 0.06$. When the lens groups are distributed according to the above-mentioned focal powers, a projection ratio less than 0.21 may be achieved, and the overall length of the optical system is less than 202 mm. The 4K oscillating mirror can be assembled between the optical system and the DMD chip, and the semi-aperture size of the aspherical reflector 500 also can be less than 50 mm. In addition, the sensitivity of a fitting allowance of the system can be substantially reduced, and batch production can be realized.

According to the above ultra-small-sized 4K-resolution ultra-short-focus projection optical system, the focal power of the second lens group 420 is positive and satisfies $0.0002 \leq |\varphi_{420}| \leq 0.0003$. The third lens group 420 is a glass aspherical surface, and both surfaces of the third lens group 420 are bent towards the DMD chip 100. The third lens group 420 is made of low-dispersion glass and satisfies $70 < Vd_{420} < 95$. Conjugate distance variations under different projection distances can be compensated after the above conditions are satisfied simultaneously. Meanwhile, field curvatures and distortions under different projection distances also can be corrected, so as to keep the resolutions under different projection distances unchanged.

According to the above ultra-small-sized 4K-resolution ultra-short-focus projection optical system, the focal power of the eleventh lens 11 is negative. Both surfaces of the eleventh lens 11 are back on to the DMD chip 100. The focal power of the eleventh lens 11 satisfies $0.016 \leq |\varphi_{11}| \leq 0.018$. A distanced between the eleventh lens 11 and the diaphragm 12 is longer than 62 mm. The eleventh lens 11 can be kept at a temperature below 30° C. during use of the lens, which ensures that an optical focus does not drift when the projection system outputs luminance over 4000 lumens, so that a picture of the lens is still clear during long-time use of a projector without being focused.

According to the above ultra-small-sized 4K-resolution ultra-short-focus projection optical system, the second lens 2 and the third lens 3 are adhered through optical glue, and the fourth lens 4 and the fifth lens 5 are adhered through the optical glue.

According to the above ultra-small-sized 4K-resolution ultra-short-focus projection optical system, the first lens 1, the sixth lens 6 and the eighth lens 8 are glass aspherical surfaces, and the eleventh lens 11 and the aspherical reflector 300 are plastic aspherical lenses.

The eleventh lens 11 has the negative focal power and is a plastic aspherical lens, so as to correct coma aberrations and distortions which are generated by a large visual field.

The tenth lens 10 has the negative focal power; the first surface is bent towards the DMD chip and the second surface is back on to the DMD chip; and the ninth lens 9 has the positive focal power and is a bi-convex lens, and the focal powers satisfy $0.016 \leq |\varphi_{11}| \leq 0.018$, $0.02 \leq |\varphi_{10}| \leq 0.021$ and $0.021 \leq |\varphi_{9}| \leq 0.022$, so that high-grade astigmatisms and distortions of a large visual field can be corrected, and furthermore, the height of a light ray entering a rear group is reduced, the sensitivity of the tolerance of the system is reduced, and a relatively large projection ratio is realized.

The sixth lens 6 is a glass aspherical lens and has the negative focal power. The focal power $\varphi_6$ satisfies $0.042 \leq |\varphi_6| \leq 0.043$. The sixth lens 6 can correct diaphragm spherical aberrations and diaphragm coma aberrations, so that the system can support an aperture of 2.2 at most.

The fourth lens 4 and the fifth lens 5 are glued lenses; the glued surfaces are back on to the DMD chip; and the focal powers are negative and satisfy $0.005 \leq |\varphi_{45}| \leq 0.006$. The second lens 2 and the third lens 3 are glued lenses; the glued surfaces are back on to the DMD chip; and the focal powers are positive and satisfy $0.022 \leq |\varphi_{23}| \leq 0.023$, so that vertical axis chromatic aberrations of a large visual field and axial chromatic aberrations under different wavelengths can be corrected, and an optical system has good color reduction performance.

The first lens 1 is glass aspherical lens and has the positive focal power. The focal power $\varphi_1$ satisfies $0.034 \leq |\varphi_1| \leq 0.036$. The first lens 1 can correct high-grade astigmatisms of a large visual field, and the system can obtain relatively high resolution.

Further, shapes of the aspherical surfaces of the aspherical reflector 500, the eleventh lens 11, the eighth lens 8, the sixth lens 6 and the first lens 1 satisfy the following equation:

$$Z = cy^2 / \{1 + \sqrt{1-(1+k)c^2y^2}\} + a_1y^2 + a_2y^4 + a_3y^6 + a_4y^8 + a_5y^{10} + a_6y^{12} + a_7y^{14} + a_8y^{16}.$$

In this formula, parameter c is a curvature corresponding to the radius; y is a radial coordinate, the unit of which is the same as the length unit of the lens; and k is a conical quadratic curve coefficient. When k coefficient is less than −1, the surface shape curve of the lens is a hyperbolic curve. When k coefficient is equal to −1, the surface shape curve of the lens is a parabola. When k coefficient is between −1 and 0, the surface shape curve of the lens is elliptical. When k coefficient is equal to 0, the surface shape curve of the lens is circular. When k coefficient is more than 0, the surface shape curve of the lens is flatly circular. The parameters from $a_1$ to $a_8$ respectively represent coefficients corresponding to all radial coordinates.

Actual design parameters of an ultra-short-focus lens which has an optical overall length of 202 mm, a projection ratio of 0.21 and an aperture of 2.2, can support the 4K resolution and is applicable to a 0.48-inch DMD chip are shown in the following case:

| Surface number | Type | Radius R | Thickness | Optical material | Aperture |
|---|---|---|---|---|---|
| OBJ | Object surface | Infinity | 420 | | 3400 |
| S1 | Aspherical surface | −33.9244 | −84.98 | MIRROR | 98 |
| S2 | Aspherical surface | 24.93938 | −4.07 | F52R | 43 |
| S3 | Aspherical surface | 123.8375 | −12.04 | | 46 |
| S4 | Standard | 113.3287 | −2.13 | FDS1 | 39 |
| S5 | Standard | −77.83142 | −1.46 | | 39 |
| S6 | Standard | −160.6655 | −9.15 | H-LAK10 | 39 |
| S7 | Standard | 36.21149 | −2.0 | | 39 |
| S8 | Aspherical surface | −377.2177 | −6.53 | M-FCD1 | 33 |
| S9 | Aspherical surface | −461.567 | −16.82 | | 29 |
| S10 | Standard | −18.87146 | −3.5 | H-ZF52A | 17 |
| S11 | Standard | 4196.881 | −4.75 | | 15 |
| STO | Diaphragm | Infinity | 0.92 | | 6.7 |
| S13 | Aspherical surface | 21.8358 | −3.55 | M-TAFD305 | 7.14 |
| S14 | Aspherical surface | −259.508 | −0.69 | | 8.9 |
| S15 | Standard | 19.18571 | −5.21 | FCD1 | 9 |
| S16 | Standard | 5.698087 | −2.96 | TAFD55 | 10.6 |
| S17 | Standard | 10.8387 | −0.1 | | 15.4 |
| S18 | Standard | −40.55309 | −8.48 | FCD1 | 19.4 |
| S19 | Standard | 13.22023 | −2.61 | TAFD25 | 20.4 |
| S20 | Standard | 21.6251 | −0.1 | | 23.5 |
| S21 | Aspherical surface | −116.4632 | −6.85 | M-FCD1 | 25.5 |
| S22 | Aspherical surface | 15.91648 | −0.1 | | 25 |
| S23 | Standard | infinity | −2 | H-K9L | 24 |
| S24 | Standard | infinity | −1.5 | | 24 |
| S25 | Standard | infinity | −15 | H-LAK52 | 21 |
| S26 | Standard | infinity | −6.9 | | 21 |
| IMA | Image surface | infinity | | | 18.5 |

Coefficients of the aspherical reflector S1 are as follows:
k: −1.800739
$a_1$: 0
$a_2$: −1.0597327e-006
$a_3$: −8.3222807e-011
$a_4$: 2.3262252e-014
$a_5$: −5.4686126e-018
$a_6$: −2.5680055e-022
$a_7$: −1.1154829e-025
$a_7$: 2.0543698e-030

Coefficients of the first surface S2 of the eleventh lens 11 are as follows:
k: −3.723038
$a_1$: 0
$a_2$: 7.4215285e-006
$a_3$: 9.4657756e-009
$a_4$: 7.0844328e-013
$a_5$: −5.5787244e-015
$a_6$: 5.4775315e-019
$a_7$: 2.2404819e-021

Coefficients of the second surface S3 of the eleventh lens 11 are as follows:
k: 10.12091
$a_1$: 0
$a_2$: 1.7333935e-005
$a_3$: −5.9351042e-009
$a_4$: 5.6982012e-015
$a_5$: −2.9748251e-018
$a_6$: −7.0619502e-023

Coefficients of the first surface S8 of the eighth lens 8 are as follows:
k: 379.1852
$a_1$: 0
$a_2$: −2.4030546e-005
$a_3$: 2.5671249e-008
$a_4$: −8.0809034e-012
$a_5$: 6.2264618e-014
$a_6$: −2.2279804e-018
$a_7$: −1.813092e-020

Coefficients of the second surface S9 of the eighth lens 8 are as follows:
k: 800
$a_1$: 0
$a_2$: −2.7050739e-005
$a_3$: 8.9989552e-009
$a_4$: 9.6252377e-011
$a_5$: −1.0058039e-013
$a_6$: 3.065522e-016
$a_7$: 3.2106932e-019

Coefficients of the first surface S13 of the sixth lens 6 are as follows:
k: −16.86757
$a_1$: 0
$a_2$: −3.0493001e-005
$a_3$: 4.0445005e-008
$a_4$: −5.530555e-008
$a_5$: 4.5462955e-009
$a_6$: 3.0718419e-010
$a_7$: 3.1582859e-011
$a_8$: −3.9631704e-012

Coefficients of the second surface S14 of the sixth lens 6 are as follows:
k: −799.9997
$a_1$: 0
$a_2$: −0.0001689683
$a_3$: 5.4774441e-006
$a_4$: 3.0956184e-009
$a_5$: 1.5690797e-009
$a_6$: −9.1244185e-011
$a_7$: 9.8724083e-012
$a_8$: −2.5520602e-013

Coefficients of the first surface S21 of the first lens 1 are as follows:
k: 62.06816
$a_1$: 0
$a_2$: −2.0802011e-005
$a_3$: −2.1441118e-007
$a_4$: 6.4465877e-010
$a_5$: −1.9932042e-012
$a_6$: −6.0476728e-016
$a_7$: 1.5282876e-018
$a_8$: 5.03457e-021

Coefficients of the second surface S22 of the first lens 1 are as follows:
k: −1.830338
$a_1$: 0
$a_2$: −4.1501526e-005
$a_3$: −1.6048089e-007
$a_4$: 3.9708184e-012
$a_5$: −1.0644763e-012
$a_6$: 9.4283887e-016
$a_7$: 1.9633741e-018
$a_8$: 1.2561911e-020

An ultra-short-focus projection lens has a projection range of 0.4 m to 0.6 m. During focusing of the ultra-short-focus projection lens, the first lens group 410 is moved to adjust the back focal length within +/−0.2 mm. After the back focal length is adjusted, the first lens group 410 is fixed, and the second lens group 420 is moved to realize focusing. During focusing, varying ranges of gaps between the lens groups are as follows: a gap between the first lens group 410 and the second lens group 420 is 2.2 to 0.4 mm, and a gap between the second lens group 420 and the third lens group 430 is 16.62 to 18.42 mm.

The present invention is described above in detail in combination with the drawings and embodiments. Those ordinary skilled in the art can make various change examples to the present invention according to the above-mentioned description. Therefore, some details in the embodiments shall not constitute a limitation to the present invention. The present invention will take the scope defined by attached claims as the protection scope of the present invention.

What is claimed is:

1. An ultra-small-sized 4K-resolution ultra-short-focus projection optical system, characterized by comprising in sequence in a projection direction: a DMD chip, an equivalent prism, a 4K oscillating mirror, a refraction lens assembly and an aspherical reflector, wherein the refraction lens assembly comprises in sequence along the projection direction: a first lens group capable of moving back and forth relative to the DMD chip, a second lens group capable of moving back and forth relative to the DMD chip and a third lens group which is static relative to the DMD chip; the first lens group has positive focal power; the second lens group has positive focal power; and the third lens group has negative focal power.

2. The ultra-small-sized 4K-resolution ultra-short-focus projection optical system according to claim 1, characterized in that the first lens group comprises a first lens, a second lens, a third lens, a fourth lens, a fifth lens, a sixth lens, a diaphragm and a seventh lens in sequence along the projection direction; the second lens group comprises an eighth lens, both surfaces of which are bent towards the DMD chip; the third lens group comprises a ninth lens, a tenth lens and an eleventh lens in sequence along the projection direction; the first lens has positive focal power; the second lens has negative focal power; the third lens has positive focal power; the fourth lens has negative focal power; the fifth lens has positive focal power; the sixth lens has negative focal power; the seventh lens has positive focal power; the eighth lens has positive focal power; the ninth lens has positive focal power; the tenth lens has negative focal power; and the eleventh lens has negative focal power.

3. The ultra-small-sized 4K-resolution ultra-short-focus projection optical system according to claim 1, characterized in that the DMD chip is deviated relative to an optical axis, and has a size of 0.48 inch and a resolution of 1920*1080.

4. The ultra-small-sized 4K-resolution ultra-short-focus projection optical system according to claim 2, characterized in that the focal power of the first lens group satisfies $0.04 \leq |\varphi_{410}| \leq 0.05$; the focal power of the second lens group satisfies $0.0002 \leq |\varphi_{420}| \leq 0.0003$; the focal power of the third lens group satisfies $0.009 \leq |\varphi_{430}| \leq 0.0092$; and the focal power of the aspherical reflector satisfies $0.05 \leq |\varphi_{500}| \leq 0.06$.

5. The ultra-small-sized 4K-resolution ultra-short-focus projection optical system according to claim 4, which is characterized in that the third lens group is a glass aspherical lens; and the third lens group is made of low-dispersion glass, which satisfies $70 < Vd_{420} < 95$.

6. The ultra-small-sized 4K-resolution ultra-short-focus projection optical system according to claim 2, characterized in that both surfaces of the eleventh lens are back on to the DMD chip; the focal power of the eleventh lens satisfies $0.016 \leq |\varphi_{11}| \leq 0.018$; and a distance between the eleventh lens and the diaphragm is longer than 62 mm.

7. The ultra-small-sized 4K-resolution ultra-short-focus projection optical system according to claim 6, characterized in that the eleventh lens is a plastic aspherical lens; a first surface of the tenth lens is bent towards the DMD chip, and a second surface of the tenth lens is back on to the DMD chip; the focal power satisfies $0.02 \leq |\varphi_{10}| \leq 0.021$; and the ninth lens is a bi-convex lens, and has the focal power satisfying $0.021 \leq |\varphi_9| \leq 0.022$.

8. The ultra-small-sized 4K-resolution ultra-short-focus projection optical system according to claim 2, characterized in that the sixth lens is a glass aspherical lens, and has the focal power satisfying $0.042 \leq |\varphi_6| \leq 0.043$.

9. The ultra-small-sized 4K-resolution ultra-short-focus projection optical system according to claim 2, characterized in that the fourth lens and the fifth lens are glued lenses; glued surfaces are back on to the DMD chip, and the focal powers are negative and satisfy $0.005 \leq |\varphi_{45}| \leq 0.006$; the second lens and the third lens are glued lenses; glued surfaces of the second lens and the third lens are back on to the DMD chip; and the focal powers are positive and satisfy $0.022 \leq |\varphi_{23}| \leq 0.023$.

10. The ultra-small-sized 4K-resolution ultra-short-focus projection optical system according to claim 2, characterized in that the first lens is a glass aspherical surface, and has the focal power $\varphi_1$ satisfying $0.034 \leq |\varphi_1| \leq 0.036$.

* * * * *